US008939835B2

(12) United States Patent
Tan et al.

(10) Patent No.: US 8,939,835 B2
(45) Date of Patent: Jan. 27, 2015

(54) SYSTEM AND METHOD FOR VISUALLY INDICATING ACTIONS PER MINUTE INFORMATION USING ILLUMINATION

(75) Inventors: Min Liang Tan, Singapore (SG); Dev Mohn Sudhir, Singapore (SG)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 789 days.

(21) Appl. No.: 12/655,992

(22) Filed: Jan. 12, 2010

(65) Prior Publication Data

US 2011/0172009 A1 Jul. 14, 2011

(51) Int. Cl.
*A63F 13/00* (2014.01)
*A63F 13/40* (2014.01)
*G06F 3/00* (2006.01)

(52) U.S. Cl.
CPC ............... *A63F 13/10* (2013.01); *G06F 3/002* (2013.01); *A63F 2300/1087* (2013.01); *A63F 2300/535* (2013.01)
USPC ............................................. 463/31; 463/29

(58) Field of Classification Search
CPC .............. A63F 13/08; A63F 2009/245; A63F 2009/2451; A63F 2009/2452
USPC ........................... 463/29, 31, 36; 345/33, 522
See application file for complete search history.

(56) References Cited

U.S. PATENT DOCUMENTS

| 2003/0006965 | A1 | 1/2003 | Bohn |
| 2004/0137984 | A1 | 7/2004 | Salter |
| 2004/0222977 | A1 | 11/2004 | Bear et al. |
| 2004/0224768 | A1 | 11/2004 | Hussaini et al. |
| 2007/0093291 | A1 | 4/2007 | Hulvey |
| 2008/0200224 | A1 | 8/2008 | Parks |
| 2009/0247267 | A1 * | 10/2009 | Acres ............................... 463/20 |

(Continued)

FOREIGN PATENT DOCUMENTS

| CN | 101556742 | 10/2009 |
| CN | 201368345 | 12/2009 |
| EP | 0976429 | 2/2000 |
| KR | 2001-0006225 | 1/2001 |

OTHER PUBLICATIONS

"International Search Report and Written Opinion dated Sep. 23, 2011," International Application No. PCT/SG2011/000008, 7 pages.

(Continued)

*Primary Examiner* — Damon Pierce
*Assistant Examiner* — Allen Chan
(74) *Attorney, Agent, or Firm* — Novak Druce Connolly Bove + Quigg LLP

(57) ABSTRACT

A visual indication of user proficiency at interacting with an application program such as a computer game can be provided through a system and/or method configured to determine an actions count corresponding to a number of input device signals generated and/or application program actions initiated during application program execution; normalize the actions count to determine an actions per minute value; and output illumination signals during application program execution using a set of illumination devices such as LEDs carried by an input or output device, where the illumination signals indicate a user performance level relative to a set of actions per minute thresholds. Actions per minute thresholds and/or particular illumination devices corresponding thereto can be selected or programmably specified in response to user input received by way of an illumination control GUI.

39 Claims, 10 Drawing Sheets

(56) References Cited

U.S. PATENT DOCUMENTS

| | | |
|---|---|---|
| 2009/0253509 A1* | 10/2009 | Tripp .............................. 463/37 |
| 2009/0291756 A1* | 11/2009 | McCauley et al. .............. 463/31 |
| 2010/0056269 A1* | 3/2010 | Zalewski ........................ 463/29 |
| 2010/0304841 A1* | 12/2010 | Sammon et al. ................ 463/25 |

OTHER PUBLICATIONS

"International Preliminary Report on Patentability dated Jul. 17, 2012," International Application No. PCT/SG2011/000008, 5 pages.

"Office Action dated Nov. 11, 2014," Korean Application No. 10-2012-7019990, 8 pages.

* cited by examiner

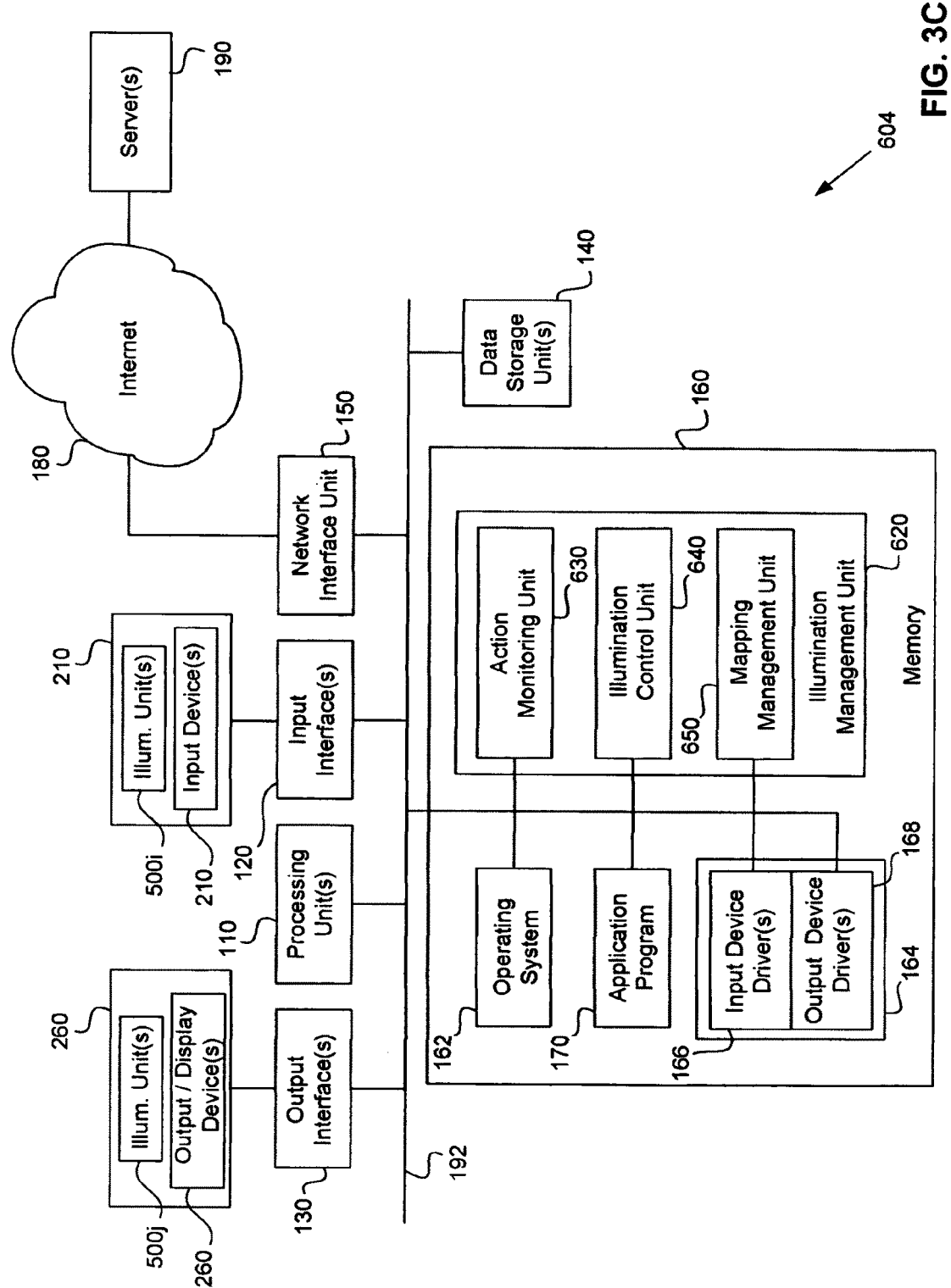

SYSTEM AND METHOD FOR VISUALLY INDICATING ACTIONS PER MINUTE INFORMATION USING ILLUMINATION

TECHNICAL FIELD

The present disclosure generally relates to systems and methods for providing a computing device user with a visual indication of the user's interaction rate with an application program. More particularly, various aspects of the present disclosure relate to systems and methods for generating illumination-based indications of a number of user initiated input device signals and/or application program actions relative to a reference time interval such as one minute.

BACKGROUND

In the context of computer gaming, an indication of how well a gamer has adapted or acclimated to game play or the demands of a game environment can be a gauge of the gamer's skill level. A quantitative measure or indication that is conventionally used to gauge the skill level of the gamer is referred to as Actions per Minute (APM).

In general, APM can be defined as the number of actions that the gamer has completed within or normalized to one minute of game play. A high APM value can indicate that the gamer is a competent player, and is therefore able to complete several or many actions within one minute of game play, while a low APM value indicates otherwise.

Software programs have been developed in order to determine a gamer's APM value. One such program is BWChart, which records game actions during game play, and provides a graphical and/or textual indication of a gamer's APM on a computer monitor's display screen during a post-play review session. Another program, known as APM Live, provides a textual indication of a gainer's APM on a computer monitor's display screen during game play.

Unfortunately, existing techniques or programs for providing garners with APM information fail to convey APM information in an easily perceived or intuitive manner. Additionally, existing techniques for providing APM information fail to facilitate or enhance the preservation of gamer focus and game play continuity during the presentation of APM information. Moreover, existing techniques for providing APM information are undesirably limited relative to the manners in which they can convey APM information on a gamer-specific basis.

A solution for addressing one or more of the foregoing problems is desired.

SUMMARY

In accordance with an aspect of the disclosure, a process for providing a visual indication of user proficiency at interacting with an application program that is executable by a processing unit includes initiating execution of the application program; receiving input device signal generated in response to user interaction with at least one input device during execution of the application program, the input device signals directed to user control of the application program; determining at least one from the group of a number of input device signals generated and a number of application program actions initiated in response to the received input device signals; and providing a set of illumination signals using a set of illumination devices separate from a display screen configured to provide a visual user interface for the application program, the set of illumination signals corresponding to one from the group of the number of input device signals generated and the number of application program actions initiated with respect to a predetermined time interval.

The application program can be a computer game, such as a standalone, multiplayer, or massively multiplayer online (MMO game), or other type of program. Providing the set of illumination signals can occur concurrent, essentially concurrent, or generally concurrent with application program execution. Additionally, the predetermined time interval can be one minute, or another time interval (e.g., seconds or minutes based).

The input device can be, for instance, a computer mouse, a keyboard, an electronic game control device such as a game controller, or another type of device. At least one illumination device within the set of illumination devices can be carried by a portion of at least one peripheral device of a computer or gaming system on which application program execution occurs, where such a peripheral device can include one from the group of a mouse, a keyboard, a game controller, a speaker, and a display device such as a computer monitor. One or more illumination devices can additionally or alternatively be carried by an adjunct device (e.g., a mouse pad) that facilitates the operation of a computer peripheral device (correspondingly, a computer mouse); and/or a repositionable illumination unit (e.g., a standalone illumination unit) that is a computer or gaming system accessory. An illumination device can additionally or alternatively be carried by a housing of a computer, a computer gaming console, a handheld electronic gaming device, a mobile computing device, and/or a mobile or cellular telephone.

Providing the set of illumination signals can include generating optical signals using one or more types of devices configured to generate or output light, such as a set of light emitting diodes (LEDs), for instance, a set of tri-color LEDs, or a light bulb.

Providing the set of illumination signals can include calculating an actions per minute value corresponding to one from the group of the number of input device signals generated and the number of application program actions initiated during an approximate one minute time interval; comparing the calculated actions per minute value to a set of actions per minute threshold values; and generating optical signals using the set of illumination devices based upon comparing the calculated actions per minute value to the set of actions per minute threshold values.

Generating optical signals can include issuing illumination control signals to the set of illumination devices, where the illumination control signals include illumination parameters corresponding to one or more of an optical wavelength, an illumination intensity, and a time varying illumination function. Generating optical signals can further include determining a highest actions per minute threshold value within the set of actions per minute threshold values that the calculated actions per minute value equals or exceeds; and outputting light having one from the group of a wavelength and an intensity corresponding to a particular actions per minute threshold value, such as the highest actions per minute threshold value.

A process for providing a visual indication of user proficiency at interacting with an application program can further include providing a graphical user interface (GUI) through which a set of actions per minute threshold values can be selected or programmably specified. Such a process can additionally or alternatively include providing a GUI through which a manner of selectively generating optical signals using at least one illumination device within the set of illumination devices can be selected or programmably specified.

Providing a GUI in accordance with an aspect of the present disclosure can include providing a GUI through which a first optical wavelength that can be generated using the set of illumination devices can be associated with a first actions per minute threshold value, and a second optical wavelength that can be generated using the set of illumination devices can be associated with a second actions per minute threshold value different than the first actions per minute threshold value.

Through a GUI in accordance with an aspect of the present disclosure, a first illumination device within the set of illumination devices can be associated with a first actions per minute threshold value, and a second illumination device within the set of illumination devices can be associated with a second actions per minute threshold value different than the first actions per minute threshold value.

Particular aspects of the disclosure can involve determining an efficiency measure that indicates a number of application programs initiated with respect to a number of input device control signals generated in relation to the predetermined time interval.

According to an aspect of the disclosure, a computer input device can include a housing; a set of transducers carried by the housing and configured to generate a set of input device signals in response to user interaction with the set of transducers; a set of illumination devices carried by the housing; and an illumination control unit carried by the housing, the illumination control unit configured to maintain an input device signal count and configured to selectively activate the set of illumination devices based upon the input device signal count. The computer input device can include at least one of a mouse, a keyboard, and a game controller.

In accordance with an aspect of the disclosure, a system for providing a visual indication of user proficiency at interacting with an application program (e.g., one or more portions of an electronic game, such as an MMO game) includes a memory in which at least a portion of the application program resides; a processing unit coupled to the memory and configured to execute the application program; a set of input devices coupled to the processing unit, at least one input device within the set of input devices configured to generate input device signals in response to user interaction with the at least one input device; a display device coupled to the processing unit, the display device providing an application program visual user interface that visually displays a set of application program actions concurrent or essentially concurrent (e.g., in a time multiplexed manner) with application program execution; an illumination control unit coupled to one from the group of the processing unit and the set of input devices, the illumination control unit configured to maintain an action count corresponding to one from the group of a number of input device signals generated and a number of application program actions initiated during application program execution; and a set of illumination devices coupled to one from the group of the processing unit and the set of input devices, the set of input devices separate from the application program visual user interface provided by the display device.

An illumination control unit can normalize an action count with respect to one or more time intervals, for instance, a time interval of approximately one minute. In one aspect, an illumination control unit can include a set of program instructions that reside within the memory. In another aspect, an illumination control unit can include hardware and/or firmware that resides upon at least one input device within the set of input devices.

An input device within the set of input devices can include one from the group of a mouse, a keyboard, and a game controller. In accordance with particular aspects of the disclosure, the set of input devices and/or a set of output devices carries at least one illumination device. Depending upon embodiment details, an illumination device can be carried by a housing of a device within a computing or gaming environment, such as a housing of a mouse, a keyboard, a game controller, a speaker, and a display device. An illumination device can include one or more of an LED, a light bulb, and an optical fiber.

A system in accordance with an aspect of the disclosure can include an illumination control GUI that resides within the memory, the illumination control GUI configured to establish in response to user input at least one manner of selectively activating the set of illumination devices based upon changes in the action count over time.

According to another aspect of the disclosure, an accessory structure for providing performance based illumination signals in response to user input received in response to user interaction with a set of input elements carried by an electronic device that includes a housing includes a cover that is couplable to a portion of the electronic device; a set of illumination devices carried by the cover; and an illumination control unit in signal communication with the set of illumination devices, the illumination control unit configured to monitor signals generated by the set of input elements carried by the electronic device. In one aspect, the cover includes a face plate configured to fit one from the group of a game controller and a cellular telephone. In another aspect, the cover a support member configured to fit a portion of one from the group of a game console housing and a computer housing. Depending upon embodiment details, the accessory structure can include one from the group of a battery and a power source link coupled to the set of illumination devices.

BRIEF DESCRIPTION OF THE DRAWINGS

Particular embodiments of the disclosure are described hereinafter with reference to the following drawings, in which:

FIG. 3C is a block diagram of an illumination system or subsystem according to yet another embodiment of the disclosure.

DETAILED DESCRIPTION

Figure 1:
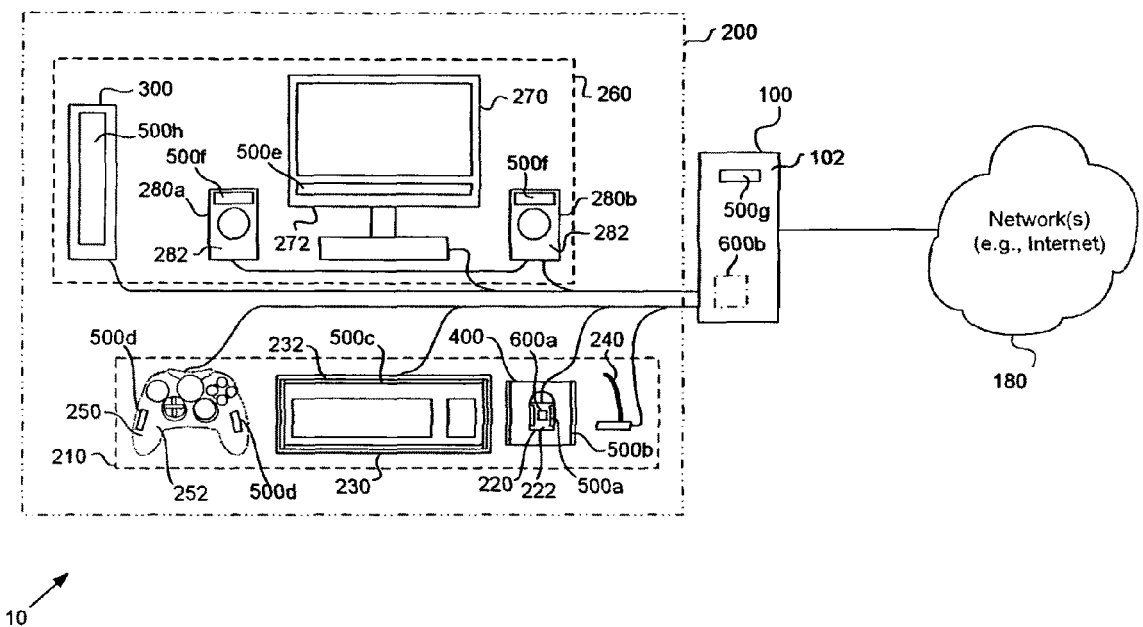
FIG. 1 is an illustration of a representative system for indicating, signaling, or conveying a number of input actions and/or program actions relative to a reference time interval using illumination according to an embodiment of the disclosure.

In general, multiple embodiments of the present disclosure are directed to systems, devices, user interfaces, methods, procedures, and/or techniques for providing a computing device user with an illumination based indication of a number of input device signals generated and/or a number of application program actions initiated relative to a reference time interval in response to user interaction with a set of input devices during an application program's execution. Such an illumination based indication can correspond or relate to a computer user's proficiency or efficiency in communicating with or successfully controlling the application program.

Various embodiments of the present disclosure involve 1) maintaining a set of action or event counts corresponding to a) input device signals, and/or b) application program actions that arise in response to input device signals; and 2) generating illumination control signals that are directed, output, or provided to particular illumination systems, subsystems, apparatuses, units, or devices at one or more times based upon the set of action counts. The issuance of illumination control signals to one or more illumination devices results in the generation of optical signals that can visually convey a proficiency or performance level in a manner that is related to an action count. Thus, the issuance of illumination control signals to a set of illumination devices in accordance with the present disclosure can provide a computer user or an observer with visual or optical feedback associated with the user's ability to issue signals to an application program or control an application program to achieve one or more intended results.

In the description that follows, the term "input action" corresponds to an input device signal generated during application program execution; and the term "input action count" corresponds to a number of input actions generated during at least a portion of an application program's execution. The term "program action" corresponds to an application program instruction, instruction sequence, operation, action, action sequence, or procedure initiated in response to an input action. Additionally, the term "program action count" corresponds to a number of program actions initiated during at least a portion of an application program's execution.

In several embodiments, an input action can be categorized with respect to a type of input device signal, a type of application program operation to which the input action is directed, and/or a measure of success in program action initiation following input action generation. An input action can be 1) relevant to communicating with or controlling an application program in a particular manner; or 2) extraneous in relation to initiating an intended or desired program action. For example, in a computer gaming context, a series of mouse or keyboard signals respectively generated in response to a gamer's mouse clicks or key presses can control a displayed game character or avatar in an intended manner. However, incomplete, inadvertent, or misdirected mouse or keyboard signals can result in non-useful, unintended, or undesirable consequences, such as game character inaction or misdirection. Thus, an input action may or may not initiate an intended type of program action. A ratio of a program action count to an input action count can be defined as an efficiency measure or score. An efficiency measure or score can indicate a percentage of user interactions with an input device that give rise to program actions. An input action count, a program action count, and/or an efficiency measure that is normalized or considered in relation to a reference or benchmark time period or interval can indicate a computer user's proficiency or skill level in achieving a set of intended application program objectives.

In several embodiments, particular illumination control signals can be selectively generated and output based upon an action count or an efficiency measure that is normalized relative to a unit time reference or a reference time interval such one minute. Herein, the term actions per minute (APM) refers to an action count that is normalized to a one minute reference time interval. The term "input APM" refers to a number of input actions normalized relative to one minute (e.g., an input action count normalized to one minute); and the term "program APM" refers to a number of application program actions initiated in response to input actions, normalized to one minute (e.g., a program action count relative to one minute). In certain embodiments, the term efficiency per minute (EPM) refers to a ratio of program APM to input APM.

Depending upon embodiment details, the maintenance of action counts, input APM values, program APM values, EPM values, and/or the generation of illumination control signals corresponding thereto can be performed by hardware and/or software. Certain embodiments provide for additional or other reference time intervals, such as one hour or one complete application program execution period.

In general, an illumination control signal can be a digital or analog signal that is characterized by a set of illumination parameters. In some embodiments, illumination parameters can include or correspond to one or more of a set of color signals, a brightness or intensity signal, and possibly a time varying illumination function. Illumination control signals can be directed or issued to an illumination driver or an illumination management circuit that interfaces to, operates, or drives one or more illumination devices. In certain embodiments, illumination parameters can specify a current and/or voltage level for one or more illumination devices, possibly in accordance with a modulation scheme (e.g., pulse width modulation). Depending upon embodiment details, illumination control signals can be communicated by way of wire-based and/or wireless transmission.

Illumination systems, subsystems, apparatus, units, or devices in accordance with the present disclosure can include a set of active and/or passive illumination or optical devices or elements. An active optical element can include a light emitting diode (LED), a laser, a light bulb (e.g., a neon or incandescent light), and/or other type of optical signal or light generation device. A passive optical element can include an optical fiber, a light pipe or tube, a lens, a mirror, a prism, an optical window, a grating or hologram, and/or other type of device that facilitates light transmission, propagation, reflection, or diffraction. In response to a given illumination control signal, an illumination device can generate, emit, output, or propagate light of a particular color and/or intensity, possibly in accordance with a time varying illumination function.

Representative types of illumination units that are suitable for use in various embodiments of the disclosure include backlighting systems, LED arrays, and light strips or light bars. Such illumination units can include or be coupled to 1) electrical circuitry (e.g., a microcontroller and/or a driver chip) for initiating, adjusting, routing, or terminating the light output or transmitted by optical elements in accordance with illumination control signals; and possibly 2) electrical circuitry for receiving illumination control signals from and/or transmitting illumination control signals to other devices.

In some embodiments according to the present disclosure, an illumination unit can include a set of tri-color LEDs that can be driven to generate and output optical signals spanning a spectral range based upon the generation and combination of red, green, and blue light. Such tri-color LEDs can be organized into arrays in order to provide a desired maximum attainable brightness level. In a representative implementation, an illumination unit can include one or more Agilent HSMF-C113 or HSMF-C115 tri-color LEDs, plus appropriate corresponding driver circuitry.

In various embodiments, a set of illumination devices can be carried by portions of particular apparatuses, devices, or structures that are expected to be within a computer user's or an observer's field of view, or which are sufficiently proximate to the computer user or observer that the computer user or observer can perceive optical signals output by the illumination device(s). An apparatus, device, or structure that carries an illumination unit or an illumination device in accordance with the present disclosure can be defined to be a visual feedback source. A set of illumination units or illumination devices can be carried by portions of one or more computing systems, computing devices, electronic devices, adjunct devices, and/or accessory elements or structures in a user's environment. Such devices in the user's environment can include one or more of an input device; an output device such as a computer monitor or display device, or an audio device; a computer or game console or gaming device; a separate (e.g., a stand-alone or attachable/detachable) illumination apparatus; a mobile or cellular telephone handset; or other type of carrying device or structure.

An input device in accordance with the present disclosure can be essentially any type of wire-based or wireless computing or electronic device that generates and outputs electromagnetic input device signals in response to particular types of user interaction with or manipulation of one or more input controls or control elements. Typically, an input control element includes at least one type of transducer or transducing element. Representative types of input devices applicable to various embodiments of the present disclosure can include one or more of a mouse (e.g., a gaming mouse), a trackball, a joystick or analog stick, a pointing stick, a touchpad, a touch screen, a game console controller, a keyboard or keypad, a microphone, or other type of device.

Some embodiments of the present disclosure facilitate the generation of a graphical user interface (GUI) through which a computer user can selectively or programmably define one or more manners in which optical signals indicative of input actions, program actions, or efficiency measures per time interval are to be generated, updated, or adjusted based upon action count related criteria Details pertaining to particular illumination control GUIs are described below with reference to FIGS. 4A and 4B.

For purposes of brevity and to aid understanding, various embodiments of the present disclosure are described herein in the context of computer games, which can be stand-alone/single player or interactive/multiplayer computer games. For instance, multiple embodiments of the present disclosure are suitable for use with Massively Multiplayer Online (MMO) games, such as an MMO Role Playing Game (MMORPG), an MMO Real Time Strategy (MMORTS) game, an MMO First Person Shooter (MMOFPS) game, an MMO Social Game (MMOSG), an MMO Sports Game (MMOSG), or other type of MMO game. Notwithstanding, embodiments of the present disclosure encompass additional or other types of computing or electronic device contexts in which the provision of illumination based feedback to indicate user proficiency in communicating with and/or controlling an application program by way of an input device is desired (for instance, embodiments involving educational or training software, e.g., typing/keyboard proficiency, flash card learning, or language instruction software).

Representative aspects of embodiments of systems, apparatuses, devices, and processes for providing illumination based feedback to a computer user or observer in a manner that corresponds to a user performance or proficiency level with respect to an application program under consideration are described in detail hereafter with reference to FIG. 1 to FIG. 5, in which like or analogous elements or process portions are shown numbered with like or analogous reference numerals. Relative to descriptive material corresponding to one or more of FIGS. 2A-5, the recitation of a given reference numeral can indicate the simultaneous reconsideration of a FIG. in which such reference numeral was previously shown.

FIG. 1 is an illustration of a representative system 10 for indicating, signaling, or conveying a number of input actions, program actions, and/or efficiency measures relative to a reference time interval using illumination or optical signals according to an embodiment of the disclosure. In one embodiment, the system 10 includes a computer system, computing device, game console, gaming device, or other type of electronic device (e.g., a mobile phone handset) configured for executing portions of a game application program 100, and which is configured for wire-based and/or wireless communication with a set of user interface or peripheral devices 200. The set of user interface or peripheral devices 200 includes one or more input devices 210 such as a mouse 220, a keyboard, keypad, or button set 230, and a game controller 250; and one or more output devices 260 such as a computer monitor, television screen, or electronic display device 270. In some embodiments, the set of peripheral devices 200 can include a microphone 240, one or more speakers 280*a-b*, and/or another device (e.g., a webcam). In various embodiments, the system 10 can be coupled to one or more computer networks 180, such as the Internet, a Local Area Network (LAN), a Wide Area Network (WAN), a landline telephone network, a mobile telephone network, and/or another communication network. Signal communication involving one of more of such networks can include wire-based and/or wireless links.

In a representative implementation, the system 10 can include a computer 100 such as a desktop, laptop, or handheld computer that is configured to execute a Microsoft-based operating system (Microsoft Corporation, Redmond, Wash. USA) and/or an Apple-based operating system (Apple Inc., Cupertino, Calif. USA). Such a computer 100 can be coupled to a mouse 220, a keyboard 230, a computer monitor 270, a set of speakers 280, and/or one or more other devices configured to receive input from and/or provide output to a user. In another representative implementation, the system 10 can include a game console 100, for instance, a Microsoft Xbox-based console, a Playstation-based console (Sony Corporation, Tokyo, Japan), or a Nintendo Wii-based console (Nintendo Corporation, Kyoto, Japan). Such a representative implementation can include at least one appropriate type of game controller 250, such as an Xbox 360 controller, a Playstation 3 controller, or a Nintendo Wii controller.

The system 10 includes portions of one or more illumination systems or subsystems 600*a-b* configured to control a set of illumination units 500*a-h*, for instance, as further detailed below with respect to FIGS. 3A through 3C. Any given illumination unit 500*a-h* includes at least one illumination device, such as a type of device described above. In general, a set of illumination units 500a-h can be carried by the computer, computing device, or gaming device 100 and/or the set of peripheral devices 200. More particularly, in various embodiments, illumination units 500a-h or illumination devices can be carried by a portion of a housing, support member, or enclosure. For instance, as illustrated in FIG. 1 and as further illustrated below with reference to FIGS. 2A and 2B, illumination units 500 or portions thereof can be carried by or within a computer or game console case 102, a mouse frame or housing 222, a keyboard housing 232, a game controller housing 252, a computer monitor housing 272, a speaker enclosure 282, and/or another structure (e.g., a portion of a microphone stand or base or a webcam housing).

Depending upon embodiment details, the system 10 can additionally or alternatively include one or more other types of apparatuses, devices, or structures configured to carry a set of illumination units 500. In an embodiment, the system 10 can include one or more adjunct illumination devices, for instance, a repositionable or stand-alone illumination device 300 such as an illumination strip, bar, box, cube, or cylinder having an enclosure 302 in which an illumination unit 500h resides; or one or more accessory illumination devices, such as a illuminated mouse pad 400 that carries portions of an illumination unit 500b.

Figure 2A:
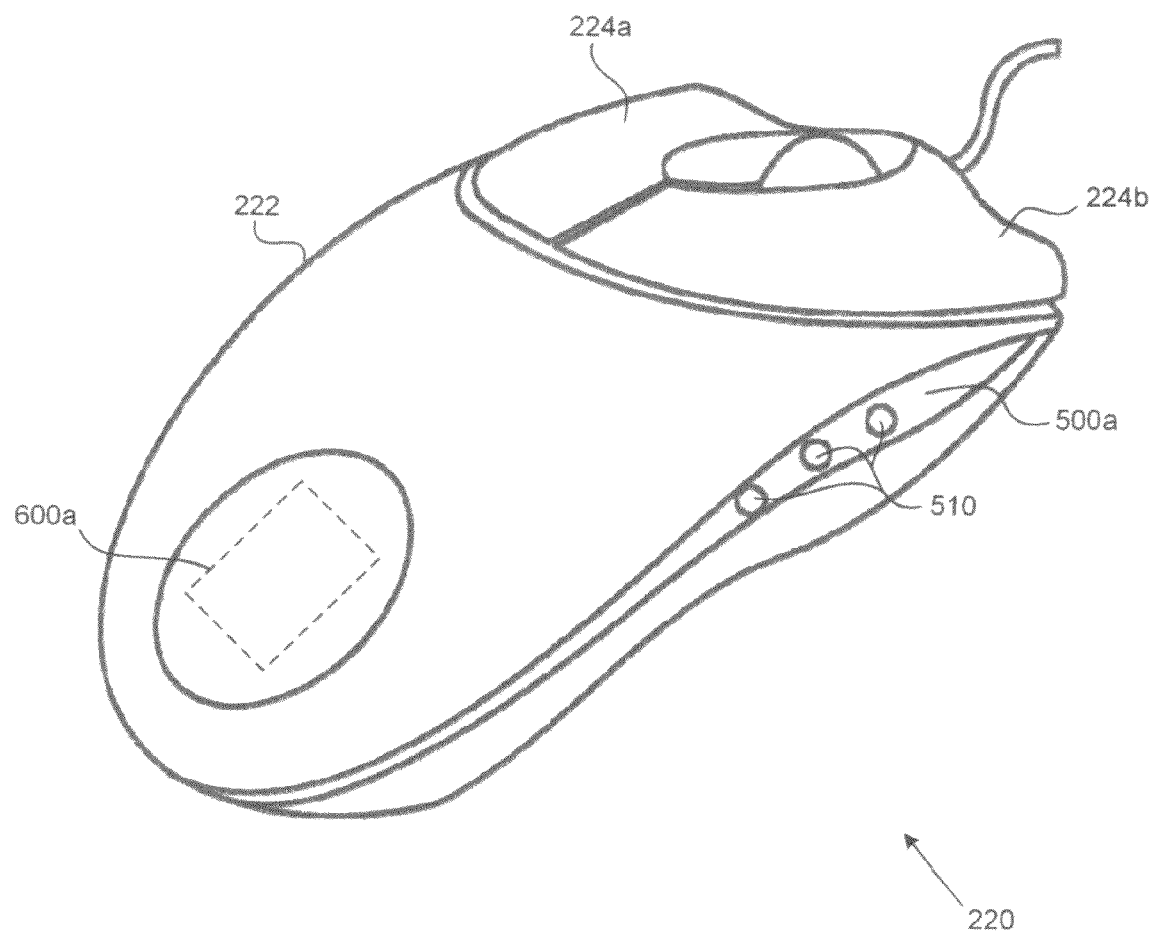
FIG. 2A is an illustration of a representative computer mouse that carries an illumination subsystem, and which includes an illumination unit according to an embodiment of the disclosure.

FIG. 2A illustrates a representative computer mouse 220 that carries an illumination subsystem 600a, and which includes an illumination unit 500a according to an embodiment of the disclosure. In an embodiment, at least a portion of the illumination unit 500a resides within the mouse housing 222. The illumination unit 500a includes a plurality of illumination devices 510 such as LEDs and/or optical fibers. The mouse housing 222 can include one or more translucent or transparent elements or windows, such that optical signals output by particular illumination devices 510 can propagate away from the mouse 220 into or toward the user's field of view.

In FIG. 2A, the mouse housing 222 is shown having cutaway portion to illustrate a representative positioning of an illumination subsystem 600a within the housing 222 (e.g., beneath a portion of the housing 222 that resides under a user's palm). Those of ordinary skill in the art will understand that the illumination subsystem 600a can reside in or upon one or more other housing locations. The illumination subsystem 600a can include hardware and firmware configured to activate or drive the LEDs, as well as hardware and firmware configured to maintain action counts and input APM values corresponding to one or more input control elements 224a-b carried by the mouse 220. The illumination system's hardware can include, for instance, one or more of an integrated circuit, discrete circuitry, a memory and a register set.

Figure 2B:
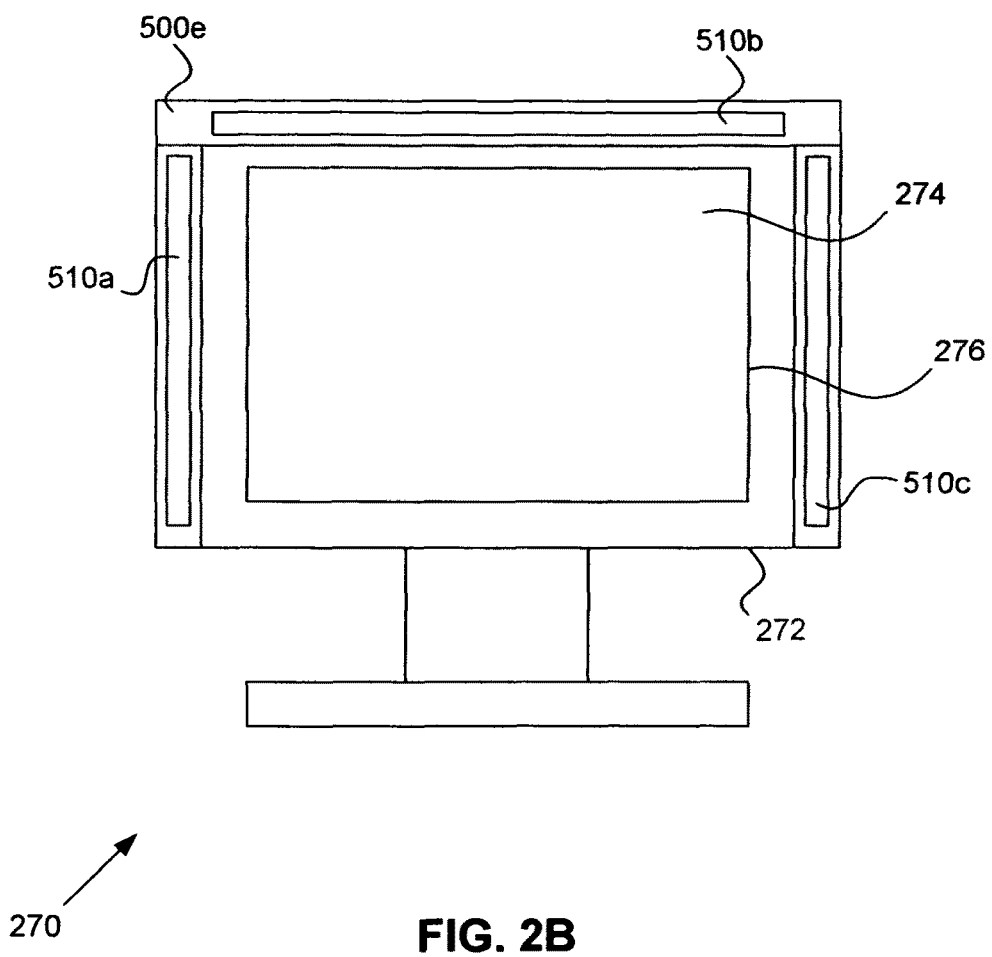
FIG. 2B is an illustration of a computer monitor that carries an illumination unit according to an embodiment of the disclosure.

FIG. 2B is an illustration of a computer monitor 270 that carries an illumination unit 500e according to an embodiment of the disclosure. In some embodiments, the illumination unit 500e is configured for wire-based or wireless communication with an illumination system or subsystem 600b that at least partially resides within the computer 100. The illumination unit 500e includes a number of illumination devices 510a-c (e.g., LEDs and/or LED arrays), and is carried by a portion of the monitor's housing 272 that is separate from, beyond, outside of, or adjacent to a boundary or border 276 defined by the monitor's display screen or window 274. In one embodiment, the illumination unit 500e is built-in to the monitor's housing 272, while in another embodiment the illumination unit 500e can include one or more attachable, movable, or detachable units. Depending upon embodiment details, the illumination unit 500e can be adjustable, movable, or repositionable to facilitate the direction of optical signals output by one or more illumination devices 510 along a user defined or user preferred travel path.

As further detailed below, in various embodiments according to the present disclosure, particular illumination devices 510 can be selectively activated, adjusted, or deactivated based upon one or more APM and/or EPM values that are detected or calculated in response to user interaction with an input device 210. In multiple embodiments, currently or recently generated APM and/or EPM values are evaluated relative to a set of predetermined or user-defined APM and/or EPM target or threshold values (e.g., that are stored in a memory) to facilitate or enable illumination device activation, adjustment, or deactivation. A given APM or EPM threshold value can be associated with or mapped to a set of illumination parameters (e.g., by way of a lookup table or other data structure), such that the output of illumination control signals to one or more illumination units 500 in accordance with the mapped set of illumination parameters results in the generation of visual feedback that indicates that a user has achieved a performance level that matches or exceeds the given APM or EPM threshold value.

As a simplified representative example to aid understanding, a set of APM threshold values can include a first through a fourth input APM threshold value as follows: 50 input APM, 100 input APM, 200 input APM, and 300 input APM. The first through the fourth input APM threshold values can respectively be mapped to a first through a fourth set of illumination parameters. For instance, 50 input APM can be mapped to a first set of illumination parameters that can result in an illumination unit 500 outputting blue light; 100 input APM can be mapped to a second set of illumination parameters that can result in an illumination unit 500 outputting green light; 200 input APM can be mapped to a third set of illumination parameters that can result in an illumination unit 500 outputting yellow light; and 300 input APM can be mapped to a fourth set of illumination parameters that can result in an illumination unit 500 outputting red light.

When a computer user or gaming device user achieves an input APM level that matches or exceeds the first, second, third, or fourth input APM threshold values, an illumination unit 500 outputs (e.g., under the direction or control of an illumination subsystem 600) light of the first, second, third, or fourth color, respectively. The output or generation of any given color of light can be maintained for a predetermined period of time, or as long as a most recently input APM value attained by the user matches or exceeds an existing or defined input APM threshold value, but is less than a next higher input APM threshold value. While the foregoing representative example considers input APM values, analogous or similar considerations apply to providing a visual indication of user performance based upon program APM values or EPM values.

As indicated above, the generation and/or control of illumination signals to visually or optically indicate a number of input actions, program actions, or an efficiency measure relative to a reference time interval can involve hardware or software. Representative hardware and software configurations corresponding to particular illumination system, subsystem, apparatus, or unit embodiments are described in detail hereafter. In any given FIG. described herein, like reference numbers can indicate or refer to like or analogous elements with respect to one or more other FIGS.

Figure 3A:
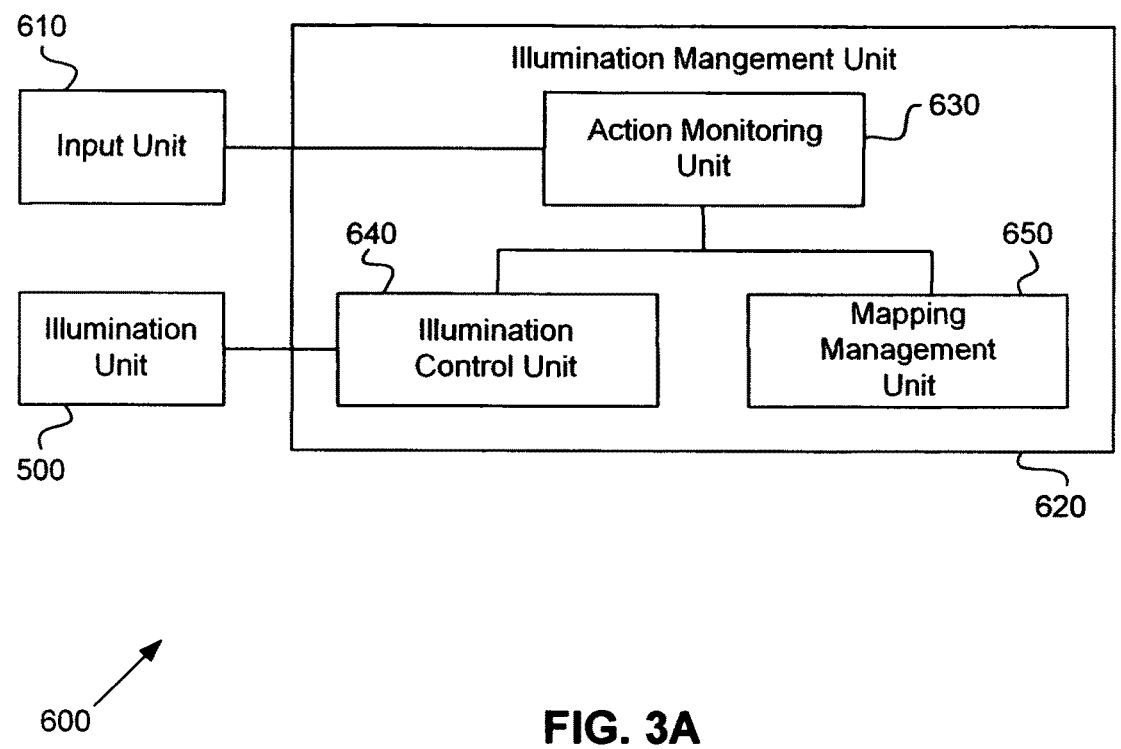
FIG. 3A is a block diagram of an illumination system or subsystem according to an embodiment of the disclosure.

FIG. 3A is a block diagram of an illumination system or subsystem 600 according to an embodiment of the disclosure. In one embodiment, an illumination system or subsystem 600 includes an input unit 610 that is coupled to an illumination management unit 620, which is coupled to at least one illumination unit 500. The input unit 610 can include one or more input devices 210, and an illumination unit 500 can include one or more sets of illumination devices 510 that are capable of generating or outputting optical signals.

The illumination management unit 620 can include an action monitoring unit 630 that is coupled to an illumination control unit 640 and a mapping management unit 650. The action monitoring unit 630 is coupled to the input unit 610, and the illumination control unit 640 is coupled to the illumination unit 500. Depending upon embodiment details, the action monitoring unit 630 can receive, monitor, track, count, evaluate, and/or analyze input actions and/or program actions to respectively generate and maintain a set of input action counts and/or a set of program action counts. The action monitoring unit 630 can further generate and maintain a corresponding set of input APM values, a set of program APM values, and/or a set of EPM values.

Based upon an input action count, an input APM value, a program action count, a program APM value, and/or an EPM value, the illumination control unit 640 selectively generates and outputs illumination control signals directed to particular illumination units 500. Such illumination control signals can indicate, communicate, or correspond to one or more colors and/or an intensity or brightness of an optical signal that an illumination device 510 can generate. The illumination control signals can also indicate or communicate a time varying illumination function (e.g., a time dependent output color or intensity function, or a duty cycle function) for modifying the generation of optical signals.

In several embodiments, the illumination control unit 640 performs or executes an illumination sequence, routine, or procedure that operates in accordance with a set of mappings, associations, or relationships between measured or calculated APM or EPM values, APM or EPM threshold values, and illumination control signals, thereby defining particular manners of controlling, energizing, or adjusting the output of a set of illumination devices 510 based upon one or more input APM values, program APM values, and/or EPM values.

In several embodiments, APM or EPM threshold values and/or associations between APM or EPM threshold values and illumination parameters can be selectively or programmably defined in response to user input. In such embodiments, an illumination system 600 can include a mapping management unit 650 that generates a GUI to facilitate the definition of mappings between APM and/or EPM threshold values and illumination parameters. A mapping management unit 650 can include program instructions that execute as part of or as a counterpart to an input device driver's operation and/or an application program's operation. Further details relating to aspects of the mapping management unit 650 are described below with reference to FIGS. 4A and 4B.

A portion of an action monitoring unit 630, an illumination control unit 640, and/or a mapping management unit 650 can be internal or external to a computer, computing device, electronic gaming device 100, or peripheral device 200 that includes, is coupled to, or is configured to communicate with an illumination device 510. For instance, in one embodiment, an action monitoring unit 630 can reside within a computer-external device such as an input device 210 (e.g., as hardware, firmware, and/or software within a mouse 220 or a keyboard 230), while in another embodiment an action monitoring unit 630 can reside within a computer 100 (e.g., as a set of program instructions and/or hardware). Representative illumination system embodiments indicating manners in which particular illumination system elements can be peripheral device based or computer based are described in detail hereafter with reference to FIGS. 3B and 3C.

Figure 3B:
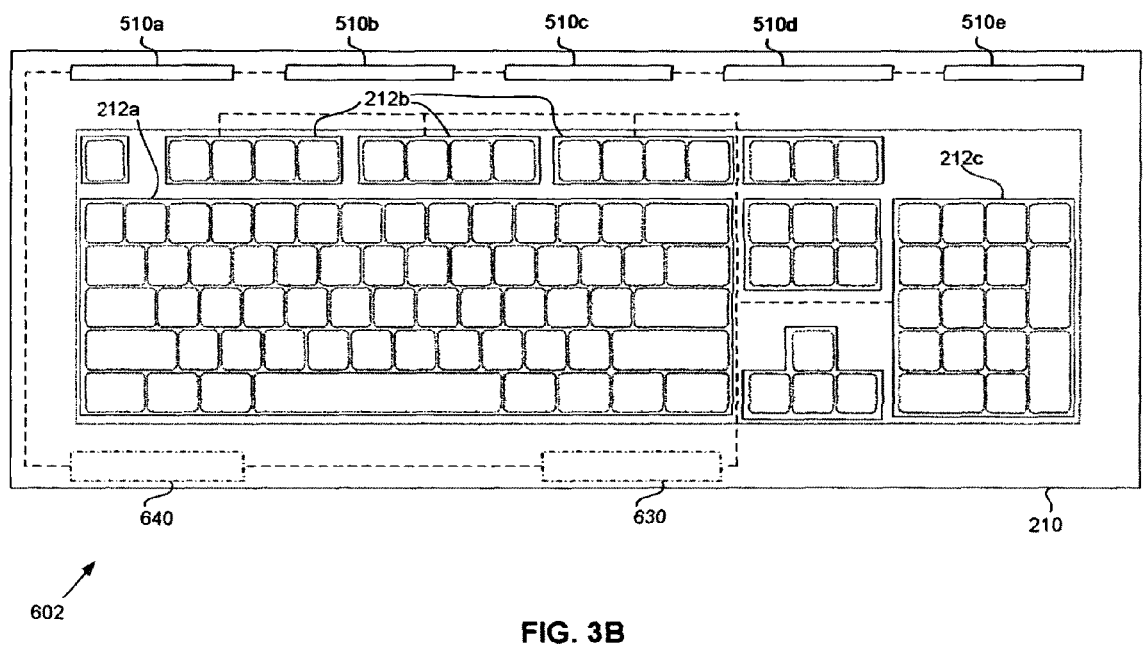
FIG. 3B is a block diagram of an illumination system or subsystem according to another embodiment of the disclosure.

FIG. 3B is an illustration of an illumination system or subsystem 602 according to another embodiment of the disclosure. In one embodiment, the illumination system 602 includes an input device 210 (e.g., a keyboard 230 as depicted, or a mouse 220 or game controller 250) that carries at least one set of control elements 212a, 212b, 212c (e.g., one or more buttons or keys), an action monitoring unit 630, an illumination management unit 640, and one or more illumination devices 510a-e (e.g., LEDs or LED arrays). For ease of understanding, FIG. 3B shows illumination devices 510a-e carried on an external surface of the input device 210; however, one or more illumination devices 510a-e can be carried within the input device 210 that is configured to provide backlighting.

In response to user interaction with or activation or actuation of a control element, the control element generates an input device signal. If the activated or actuated control element is relevant for controlling or communicating with program instruction sequences such as an application program under consideration, the action monitoring unit 630 increments an input action count (e.g., adds one to an input action value). Based upon the input action count, the illumination management unit 640 generates illumination control signals that energize or adjust the optical output of one or more illumination devices 510 carried by the input device 210. In some embodiments, an illumination procedure can be programmed or downloaded into the input device 210 (e.g., by way of an input device firmware programming operation, possibly in response to user input received by way of a GUI generated in association with an input device driver configuration procedure). Depending upon embodiment details, in certain embodiments the action monitoring unit 630 and/or the illumination control unit 640 can be activated or deactivated in response to an input device control element activation sequence (e.g., one or more button presses or keystroke entries or sequences), the selection of a particular actuator or actuator position (e.g., a slider or switch position) carried by the input device 210, or a command or handshake signal received from an application program as part of the application program's initialization or execution.

FIG. 3C is a block diagram of an illumination system 604 according to another embodiment of the disclosure. In one embodiment, the illumination system 604 includes a computer, computing device, or gaming device 100 coupled to or configured for signal transfer with at least one of a set of illumination units 500i-j. In an embodiment, the illumination units 500'i-j can be carried by a set of input devices 210 and/or a set of output devices 260. Additionally or alternatively, particular illumination units 500 i-j can be carried by one or more accessory or adjunctive devices. The computer 100 can include a processing unit 110; an input interface 120 coupled to an input device 210; and an output interface 130 coupled to computer monitor 270 or other display or output device 260. The computer 100 can also include a data storage unit 140; and a network interface unit 150, which may be coupled to a computer network 180 such as the Internet to facilitate communication with a set of other computing devices such as servers 190. The illumination system 604 further includes memory 160 in which an operating system 162; a set of device drivers 164 including an input device driver 166 and an output device driver 168; portions of an application program 170; and an illumination management unit 620 having an action monitoring unit 630, an illumination control unit 640, and a mapping management unit 650 reside. Each element of the computer 100 can be coupled to a common bus 192.

The processing unit 110 includes one or more processors (e.g., at least one microprocessor and/or microcontroller) capable of executing stored program instructions. The data storage unit 140 includes one or more types of fixed and/or removable data storage devices or elements, as well as storage media corresponding thereto. For instance, the data storage unit 140 can include a hard disk drive, a DVD or CD-ROM drive, and/or a Universal Serial Bus (USB) flash drive. The memory 160 includes one or more types of volatile and/or nonvolatile memory, such as a register set, Random Access Memory (RAM), and Read Only Memory (ROM, e.g., an Electronically Erasable Programmable ROM (EEPROM) or other type of programmable ROM). Portions of the data storage unit 130 and/or the memory 160 can form one or more computer programmable or readable media on which portions of an application program 170 and/or an illumination management unit 620 according to an embodiment of the disclosure reside (e.g., as sets of program instructions, the execution of which results in the implementation of portions of illumination procedures in accordance with the present disclosure).

Depending upon embodiment details, the computer 100 can be an isolated or stand-alone system; a peer system that communicates with other computer systems or computing devices in accordance with a peer-to-peer computing protocol; or a client system that communicates with one or more servers 190 or a server farm in accordance with a client-server computing architecture and corresponding client-server communication protocol. As previously indicated, the application program 170 can correspond to a computer game. For instance, the application program 170 can be a stand-alone computer game, or a computer game client that facilitates client-server based game play.

As indicated above, particular illumination devices 510 and/or the characteristics of optical signals generated by such illumination devices 510 can be controlled based upon one or more APM and/or EPM target or threshold values. More particularly, sets or subsets of illumination devices 510 can be controlled, energized, activated, or adjusted (e.g., by changing the characteristics of optical signals output by one or more illumination devices 510) in accordance with associations, relationships, or mappings defined between APM or EPM threshold values and illumination parameters. Depending upon embodiment details, given sets or subsets of illumination devices 510 can be controlled individually or in combination with each other. In some embodiments, particular illumination devices 510 can be controlled based upon APM and/or EPM values associated with an individual input device 210; while in certain embodiments, particular illumination devices 510 can be controlled based upon aggregate or combined APM and/or EPM values associated with multiple input devices 210. Additionally or alternatively, in one embodiment, particular sets or subsets of illumination devices 510 can be associated with particular input devices and/or computer users, possibly in a user selectable or programmable manner.

In various embodiments, a mapping management unit 650 can generate one or more illumination control GUIs that facilitate the definition, modification, or deletion of mappings between APM and/or EPM threshold values and illumination parameters corresponding to the control of one or more illumination units 500 and/or illumination devices 510. Representative illumination control GUIs are described hereafter with reference to FIGS. 4A and 4B.

Figure 4A:
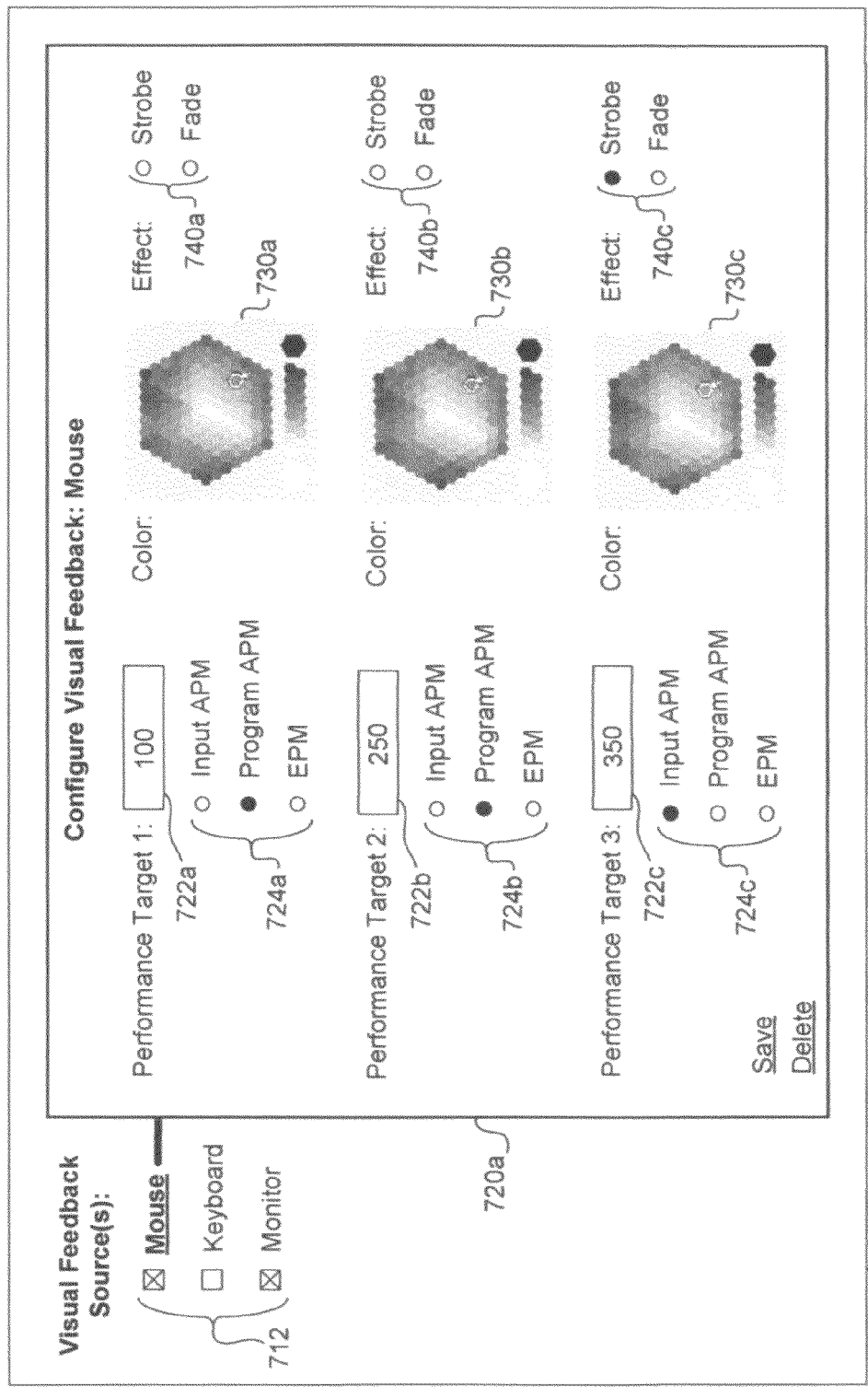
FIG. 4A is an illustration of a representative illumination control GUI, which includes a first associate window in accordance with an embodiment of the disclosure.

FIG. 4A is an illustration of a representative illumination control GUI 700 according to an embodiment of the disclosure, which provides a number of GUI elements that facilitate user configuration of APM and/or EPM threshold values, output light colors, and output light effects corresponding to a mouse 220 that carries a set of illumination devices 510. In certain embodiments, the illumination control GUI 700 provides a main window 710 that includes a set of visual feedback source (VFS) selection elements 712; and a first associate window 720a that includes a plurality of graphical elements that facilitate or enable the definition of APM or EPM threshold values as well as mappings between such threshold values and illumination parameters corresponding to a selected VFS.

In certain embodiments, the set of VFS selection elements 712 includes a set of check boxes plus textual identifiers corresponding to apparatuses, devices, or structures in a computer user's environment that a computer system 100 recognizes (e.g., in association with device driver initialization) as carrying one or more illumination devices 510. The first associate window 720 includes at least one text box 722a-c configured to receive a performance threshold or target value; at least one set of radio buttons 724a-c configured to categorize the performance threshold value as an input APM, program APM, or EPM threshold value; at least one illumination color selection interfaced 730a-c; and optionally at least one illumination effect selection interface 740a-c.

In an embodiment, in response to user selection of a VFS check box corresponding to a mouse 220, plus a user request to configure mouse illumination parameters (for instance, by way of selection of a textual identifier (e.g., by positioning a graphical pointer or cursor) corresponding to the mouse 220), a mapping management unit 650 generates or displays the first associate window 720. A first, a second, and a third text box 722a-722c can receive user input defining one or more of a first, a second, and a third APM or EPM threshold value. FIG. 4A depicts two representative program APM threshold values of 100 and 250, plus a representative input APM threshold value of 350 (e.g., as specified by user input, or in accordance with a set of default APM threshold values). For a given APM or EPM threshold value displayed by a text box 722a-c, a corresponding illumination color selection interface 730a-c can receive user input defining at least one color of light associated with this APM or EPM threshold value; and a corresponding effect selection interface 740a-c can receive user input defining a lighting or illumination condition or effect associated with the APM or EPM threshold value.

Figure 4B:
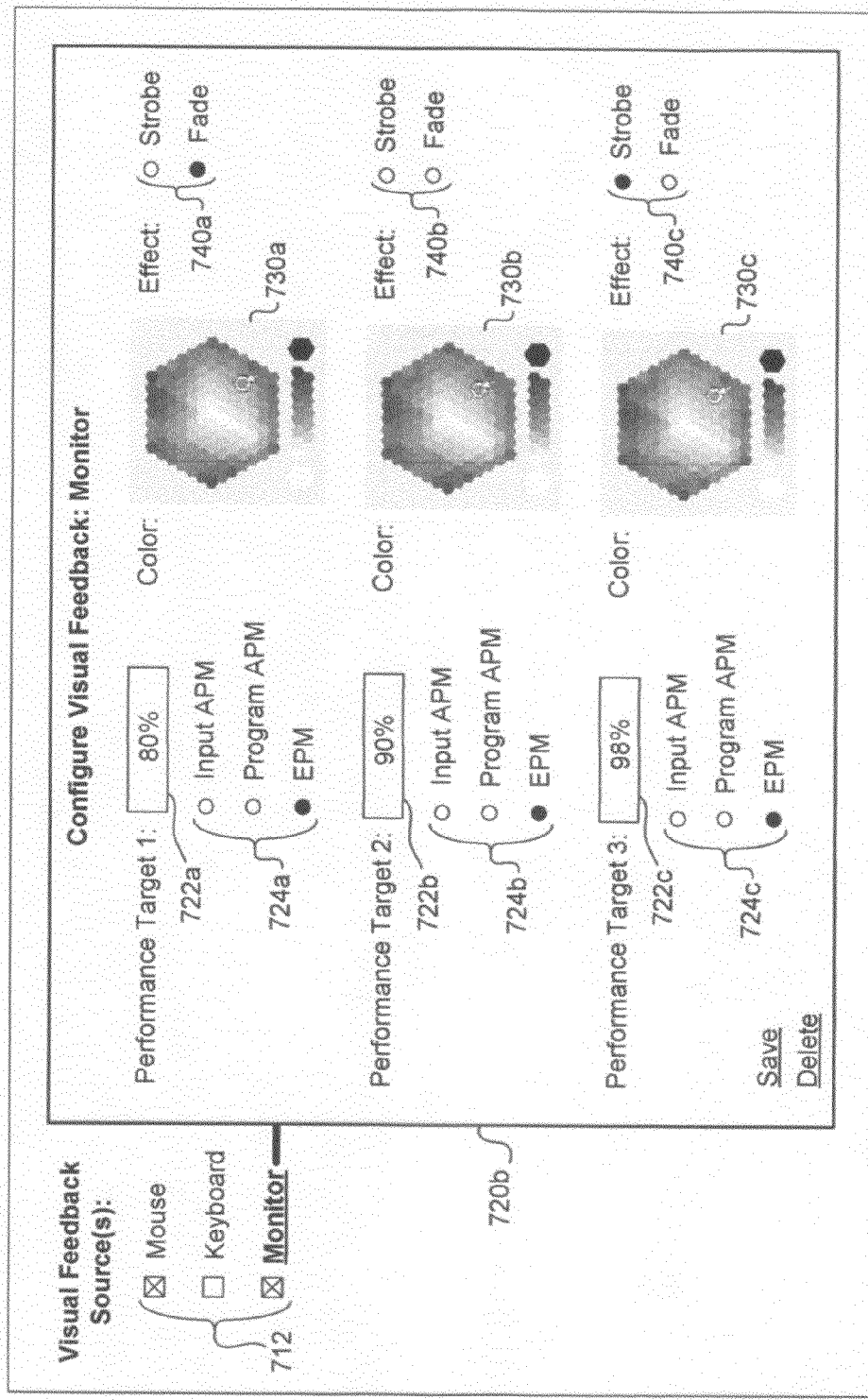
FIG. 4B is an illustration of a representative illumination control GUI, which includes a second associate window in accordance with an embodiment of the disclosure.

FIG. 4B is an illustration of a representative illumination control GUI 700 according to an embodiment of the disclosure, which provides a number of GUI elements that facilitate user configuration of APM and/or EPM threshold values, output light colors, and output lighting effects corresponding to a computer monitor 270 that carries a set of illumination devices 510. The illumination control GUI 700 of FIG. 4B is identical or a counterpart to that shown in FIG. 4A, with the exception that the GUI 700 provides a second associate window 720b that facilitates or enables the mapping of user-defined APM and/or EPM threshold values to illumination parameters corresponding to a set of illumination devices 510 carried by the computer monitor 270. In the representative second associate window 720b of FIG. 4B, representative EPM threshold values of 80%, 90%, and 98% (e.g., as specified by user input, or a set of default EPM threshold values) can be selectively mapped (e.g., in response to user input or a set of default mappings) to corresponding optical wavelengths or wavelength ranges that illumination devices 510 carried by the computer monitor 270 can generate.

In addition or as an alternative to the foregoing, in some embodiments, portions of an illumination subsystem 600, an illumination unit 500, and/or a set of illumination devices 510 can be carried by a secondary structure that can be coupled or attached to a system or device that can be configured for user interaction with a user-performance driven application program such as an electronic game. The secondary structure can be an add-on or optional (e.g., after market) accessory that couples to a computing or gaming device or system, and which provides the gaming device or system with performance related illumination functionality in accordance with the present disclosure. Aspects of representative secondary structures are described in detail hereafter with reference to FIGS. 5A and 5B.

Figure 5A:
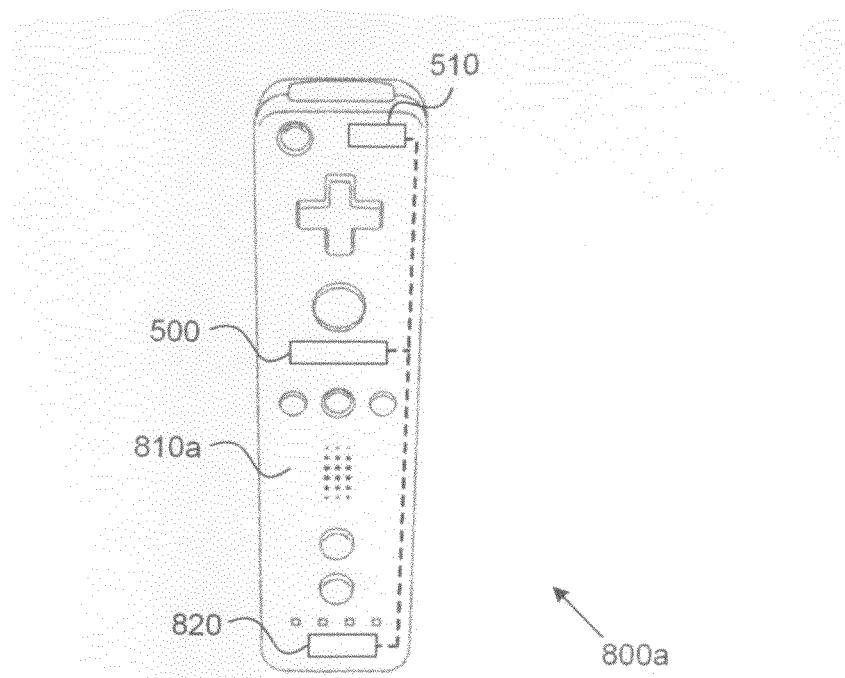
FIGS. 5A and 5B are illustrations of secondary illumination structures according to particular embodiments of the disclosure.
Figure 5B:
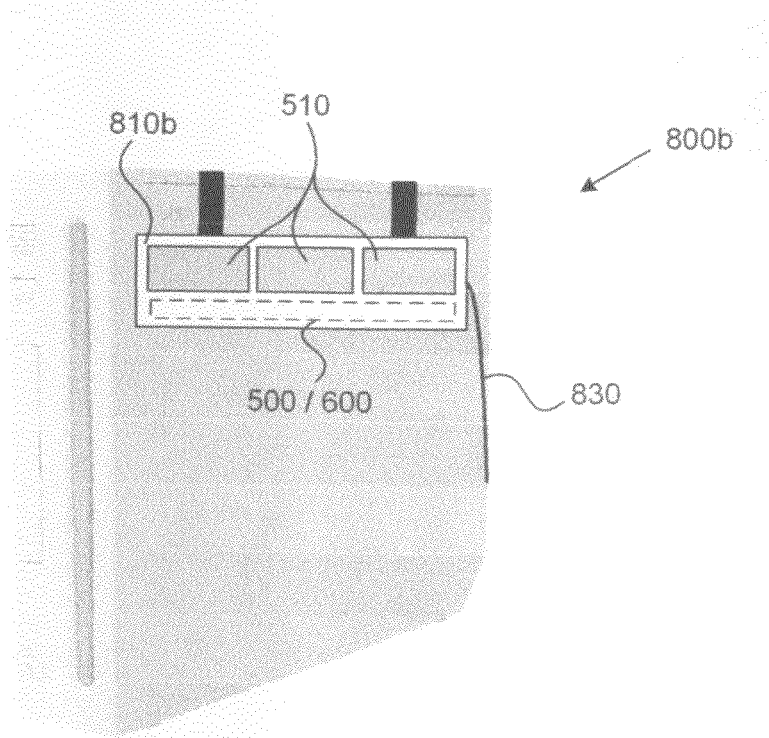

FIGS. 5A and 5B are illustrations of secondary illumination structures 800a, 800b according to particular embodiments of the disclosure. In an embodiment, a secondary illumination structure 800a, 800b includes an outer cover, casing, shell, fitting, layer, or "skin" 810a, 810b that replaces or which couples to or fits onto or over one or more portions of a computing or gaming device housing, or the housing of a device that can be associated with a gaming environment. The secondary illumination structure 800a, 800b can carry portions of an illumination unit 500, a set of illumination devices 510, and/or an illumination subsystem 600 configured to output performance related illumination signals in accordance with one or more embodiments of the present disclosure. Additionally, the secondary illumination structure 800a, 800b can carry a power source 820 such as a battery, and/or a link 830 that supplies power or which couples to a power source (e.g., a USB cable that couples to a computer 100, or a coupling to a source of line power provided by a power adapter).

In a representative embodiment shown in FIG. 5A, a secondary illumination structure 800a includes a face plate 810a that replaces or fits over (e.g., by way of a snap-fit, a form-fit, a set of coupling members such as tabs, and/or a set of fasteners such as screws) a portion of a game controller 250 or other device (e.g., a mobile phone handset). Depending upon embodiment details, the face plate 810a can carry a set of illumination devices 510 (e.g., LEDs) and possibly portions of an illumination unit 500 and/or an illumination subsystem 600 that facilitate monitoring, counting, or tracking input actions or APM values and/or providing performance based illumination signals in accordance with the present disclosure.

The game controller 250 includes a set of input elements (e.g., buttons and/or keys) in a manner understood by one of ordinary skill in the art. Portions of the secondary illumination structure 800a can include couplings to particular game controller input elements and an illumination unit 500 to facilitate APM counting or tracking. Such couplings can be provided, for instance, by way of secondary or hidden input elements (e.g., implemented using thin membrane-based switches) carried by the face plate 810a, which are interposed between or adjacent to the game controller input elements themselves. Any given secondary or hidden input element is responsive to user input directed to a particular game controller input element that corresponds to the secondary or hidden input element to facilitate input action monitoring or tracking. In addition to the foregoing, portions of the face plate 810a can extend beyond an as-manufactured game controller housing to accommodate illumination devices 510 and/or circuitry associated with an illumination unit 500 and/or an illumination subsystem 600.

In a representative embodiment shown in FIG. 5B, a secondary illumination structure 800b includes an illumination support member 810b that can be attached, secured, fitted, or adhered to a portion of a computer or game console housing 102. In certain embodiments, an illumination unit 500 carried by a secondary illumination structure 800a such as that shown in FIG. 5A can be configured for wireless or wire-based communication with an illumination unit or an illumination subsystem 600 carried by a secondary illumination structure 800b such as that shown in FIG. 5B.

Figure 6:
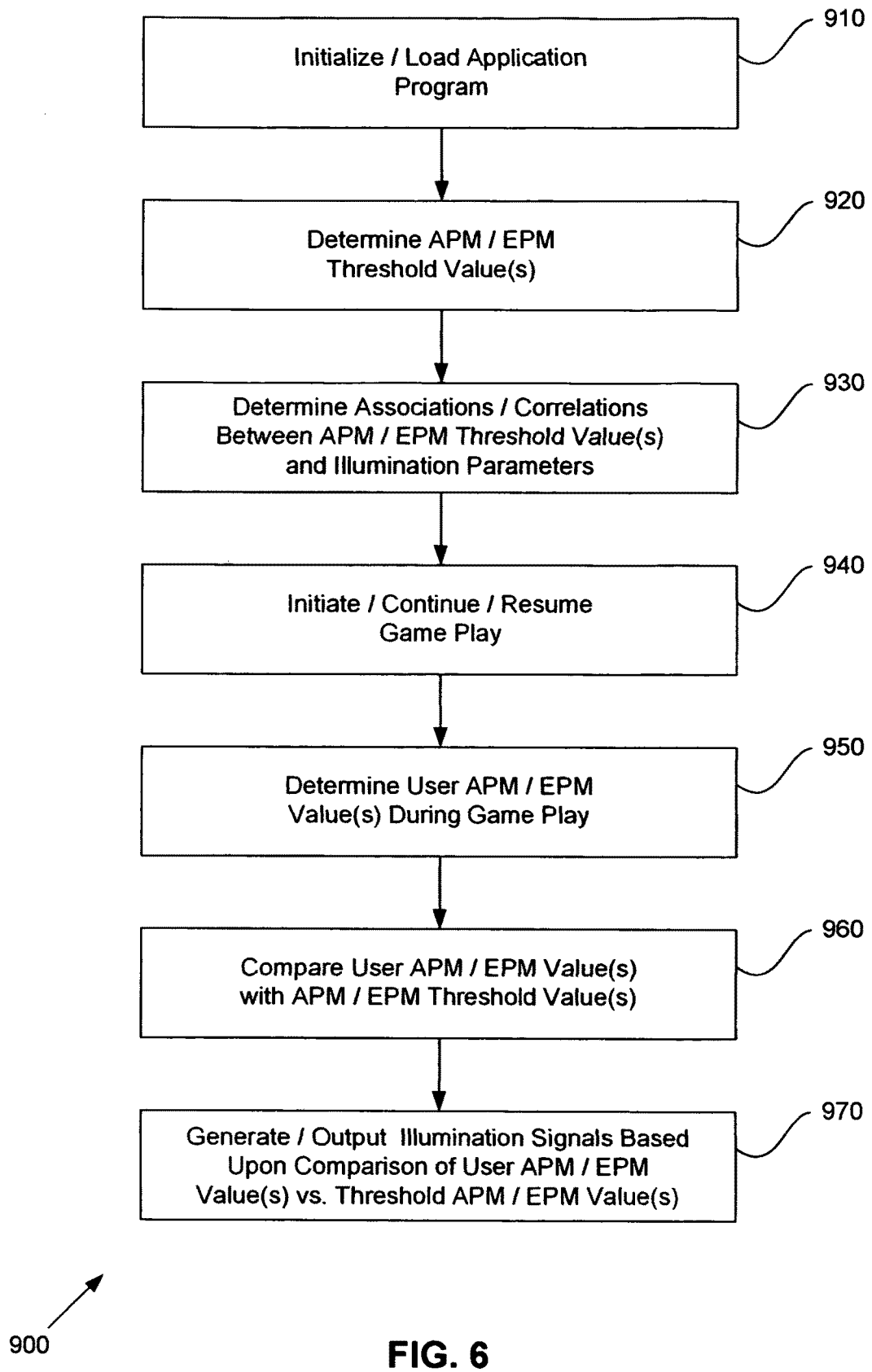
FIG. 6 is a flow diagram of a process for providing performance related illumination signals according to an embodiment of the disclosure.

FIG. 6 is a flow diagram of a process 900 for providing performance related illumination signals according to an embodiment of the disclosure. In an embodiment, a first process portion 910 involves initializing or loading an application program such as a computer game. A second process portion 920 involves determining, defining, or retrieving a set of APM and/or EPM threshold values associated with one or more devices or structures that carry illumination units 500 or illumination devices 510, and which are configured for communication with a computer system, computing device, or gaming device 100 upon which the application program executes. A third process portion 930 involves determining or defining mappings, associations, or relationships between particular APM and/or EPM threshold values and illumination parameters corresponding to such illumination units 500 or illumination devices 510. The second and third process portions 920, 930 can involve one or more GUIs, such as one or more illumination control GUIs 700, in a manner identical or analogous to that described above.

A fourth process portion 940 involves initiating the execution of portion(s) of the application program that are relevant to one or more user performance levels under consideration (e.g., actual game play), and a fifth process portion 950 involves determining APM and/or EPM values in response to user input directed to controlling or communicating with the application program. A sixth process portion 960 involves evaluating or comparing current and/or recent user APM or EPM values relative to APM or EPM threshold values, respectively. Finally, a seventh process portion 970 involves providing or outputting illumination signals in the visual environment of a computer user or observer based upon a highest APM or EPM threshold value that a current or recent user APM or EPM value exceeds, respectively. The seventh process portion 970 can involve activating, adjusting the output of, or deactivating one or more illumination units 500 or illumination devices 510 (e.g., by way of generating, issuing, outputting, or transferring illumination control signals) that are carried by or configured for communication with the computer system 100. In various embodiments, portions of the seventh process portion 970 are performed during or concurrent with (e.g., in a multithreaded manner) the execution of those parts of the application program that are relevant to a type of user performance under consideration. Thus, in an electronic gaining context, portions of the seventh process portion 970 are performed in real time or near-real time during actual game play. As a result, the seventh process portion 970 can provide a computer user, gamer, or observer with real-time or near real-time feedback that indicates the user's performance or proficiency level by way of illumination.

In multiple embodiments, performance-indicative illumination is generated by one or more illumination units 500 or illumination devices 510 that are distinct or separate from (e.g., beyond or outside a border of, adjacent to, proximate to, or removed from) a display screen or physical or graphical window 272 in which actual user interaction with the application program (e.g., game play or other performance-relevant user interaction) occurs. Additionally or alternatively, in some embodiments one or more graphical elements (e.g., graphical bars or other elements that are small or unobtrusive with respect to a main application interaction/execution window) that graphically provide real time or near-real time illumination based performance feedback (for instance, color and/or optical signal effect (e.g., fading and/or strobing based) to the user can be generated within a display screen or physical or graphical window 272 in which performance relevant user interaction with the application program occurs. Illumination control GUIs 700 in accordance with the present disclosure can thus additionally or alternatively provide for user-defined or programmable configuration of APM or EPM thresholds and illumination parameters corresponding to such graphical elements.

Particular embodiments of the disclosure are described above for addressing at least one of the previously indicated problems. While features, functions, advantages, and alternatives associated with certain embodiments have been described within the context of those embodiments, other embodiments may also exhibit such advantages, and not all embodiments need necessarily exhibit such advantages to fall within the scope of the disclosure. It will be appreciated that several of the above-disclosed and other structures, features and functions, or alternatives thereof, may be desirably combined into other different devices, systems, or applications. The above-disclosed structures, features and functions, or alternatives thereof, as well as various presently unforeseen or unanticipated alternatives, modifications, variations or improvements thereto that may be subsequently made by one of ordinary skill in the art, are encompassed by the following claims.

What is claimed is:

1. A method for providing a visual indication of user proficiency at interacting with an application program that is executable by a processing unit, the method comprising:
   initiating execution of the application program;
   receiving input device signals generated in response to user interaction with at least one input device during execution of the application program, the input device signals directed to user control of the application program;
   determining at least one from the group of a count of input device signals generated during a predetermined time interval and a count of application program actions initiated during the predetermined time interval in response to the received input device signals;
   comparing, the at least one from the group of the count of input device signals and the count of application program actions, to a plurality of predetermined threshold values; and
   associating the comparison of, the at least one from the group of the count of input device signals and the count of application program actions, with a set of illumination parameters;
   providing a set of illumination signals using a set of illumination devices separate from a display screen configured to provide a visual user interface for the application program, the set of illumination signals corresponding to the set of illumination parameters;
   providing a graphical user interface (GUI) for programming at least one of, the plurality of predetermined threshold values and the set of illumination parameters;
   wherein the set of illumination parameters is downloadable from the processing unit into the at least one input device.

2. The method of claim 1, wherein providing the set of illumination signals is performed concurrent with application program execution.

3. The method of claim 1, wherein the predetermined time interval is one minute.

4. The method of claim 1, wherein the application program comprises an electronic game.

5. The method of claim 1, wherein the application program corresponds to a massively multiplayer online (MMO) computer game.

6. The method of claim 1, wherein the input device comprises an electronic game control device.

7. The method of claim 6, wherein the electronic game control device comprises at least one from the group of a mouse, a keyboard, and a game controller.

8. The method of claim 1, wherein at least one illumination device within the set of illumination devices is carried by a portion of at least one peripheral device of a computer system on which application program execution occurs.

9. The method of claim 8, wherein the at least one peripheral device comprises one from the group of a mouse, a keyboard, a game controller, a speaker, and a computer monitor.

10. The method of claim 1, wherein the set of illumination devices is carried by at least one from the group of a computer peripheral device coupled to a computer system on which application program execution occurs, an adjunct device that facilitates the operation of a computer peripheral device coupled to the computer system on which application program execution occurs, and a repositionable illumination unit that is an accessory to the computer system on which application program execution occurs.

11. The method of claim 10, wherein the set of illumination devices is carried by the adjunct device, and wherein the adjunct device comprises a mouse pad.

12. The method of claim 1, wherein the set of illumination devices is carried by a housing of at least one from the group of a computer, an computer gaming console, a handheld electronic gaming device, and a cellular telephone.

13. The method of claim 1, wherein providing the set of illumination signals comprises generating optical signals using one from the group of a light emitting diode (LED) and a light bulb.

14. The method of claim 13, wherein providing the set of illumination signals comprises generating optical signals using a tri-color LED.

15. The method of claim 1, comprising:
   calculating an actions per minute value corresponding to one from the group of the count of input device signals generated and the count of application program actions initiated, during a one minute time interval;
   comparing the calculated actions per minute value to a set of actions per minute threshold values, the set of actions per minute threshold values corresponding to the plurality of predetermined threshold values;
   associating, the comparison of the calculated actions per minute to the set of actions per minute threshold values, with the set of illumination parameters; and
   generating optical signals using the set of illumination devices based upon the set of illumination parameters.

16. The method of claim 15, wherein generating optical signals comprises issuing illumination control signals to the set of illumination devices, and wherein the illumination parameters corresponds to at least one of an optical wavelength, an illumination intensity, and a time varying illumination function.

17. The method of claim 15, wherein generating optical signals comprises:
   determining a highest actions per minute threshold value within the set of actions per minute threshold values that the calculated actions per minute value equals or exceeds; and
   outputting light having one from the group of a wavelength and an intensity corresponding to the highest actions per minute threshold value.

18. The method of claim 15, wherein the set of actions per minute threshold values is programmable with the GUI.

19. The method of claim 15, wherein a manner of selectively generating optical signals using at least one illumination device within the set of illumination devices is programmable with the GUI.

20. The method of claim 15, wherein, with the GUI, a first optical wavelength that can be generated using the set of illumination devices is associable with a first actions per minute threshold value, and a second optical wavelength that can be generated using the set of illumination devices is associable with a second actions per minute threshold value different from the first actions per minute threshold value.

21. The method of claim 15, wherein, with the GUI, a first illumination device within the set of illumination devices is associable with a first actions per minute threshold value, and a second illumination device within the set of illumination devices is associable with a second actions per minute threshold value different from the first actions per minute threshold value.

22. The method of claim 1, further comprising determining an efficiency measure that indicates a correlation of the count of application program actions initiated with the count of input device control signals generated during the predetermined time interval.

23. A computer input device communicable with a computing device and responsive to interaction with a user, the computer input device comprising:
   a housing;
   a set of transducers carried by the housing and configured to generate a set of input device signals in response to user interaction with the set of transducers;
   a set of illumination devices carried by the housing; and
   an illumination control unit carried by the housing, the illumination control unit configured to maintain an input device signal count and configured to selectively activate the set of illumination devices based upon the input device signal count during a predetermined time interval;
   wherein the input device signal count is compared to a plurality of predetermined threshold values to determine a set of illumination parameters for selectively activating the set of illumination devices;
   wherein at least one of the plurality of predetermined threshold values and the set of illumination parameters is a programmable with a graphical user interface (GUI) on the computing device; and
   wherein the set of illumination parameters is downloadable into the computer input device.

24. The computer input device of claim 23, wherein the computer input device comprises one from the group of a mouse, a keyboard, and a game controller.

25. A system for providing a visual indication of user proficiency at interacting with an application program, the system comprising:
   a memory in which at least a portion of the application program resides;
   a processing unit coupled to the memory and configured to execute the application program;
   a set of input devices coupled to the processing unit, at least one input device within the set of input devices configured to generate input device signals in response to user interaction with the at least one input device;
   a display device coupled to the processing unit, the display device providing an application program visual user interface that visually displays a set of application program actions concurrent with application program execution;
   an illumination control unit coupled to one from the group of the processing unit and the set of input devices, the illumination control unit configured to maintain an action count corresponding to at least one from the group of a count of input device signals generated during a predetermined time interval and a count of application program actions initiated during application program execution in the predetermined time interval;
   a mapping management unit for comparing the at least one from the group of the count of input device signals and the count of application program actions, to a plurality of predetermined threshold values, the mapping management unit further for associating the comparison with a set of illumination parameters; and
   a set of illumination devices for providing a set of illumination signals corresponding to the set of illumination parameters, the set of illumination devices, coupled to one from the group of the processing unit and the set of input devices, and separate from the application program visual user interface provided by the display device;
   a graphical user interface (GUI) for programming at least one of the plurality of predetermined threshold values and the set of illumination parameters;
   wherein the set of illumination parameters is downloadable from the computing into the at least one input device.

26. The system of claim 25, wherein the action count is normalized with respect to a time interval of one minute.

27. The system of claim 25, wherein the application program comprises an electronic game.

28. The system of claim 25, wherein the application program comprises a massively multiplayer online (MMO) game.

29. The system of claim 25, wherein the illumination control unit comprises a set of program instructions that reside within the memory.

30. The system of claim 25, wherein the illumination control unit comprises one from the group of hardware and firmware residing upon at least one input device within the set of input devices.

31. The system of claim 25 wherein the set of input devices carries at least one illumination device.

32. The system of claim 31, wherein the set of input devices comprises one from the group of a mouse, a keyboard, and a game controller.

33. The system of claim 25, wherein at least one illumination device within the set of illumination devices is carried by a housing of one from the group of a mouse, a keyboard, a game controller, a speaker, and the display device.

34. The system of claim 25, wherein the set of illumination devices comprises at least one from the group of a light emitting diode (LED), a light bulb, and an optical fiber.

35. The system of claim 25, wherein the GUI resides within the memory, and the GUI is configured to establish in response to user input at least one manner of selectively activating the set of illumination devices based upon changes in the action count over time.

36. An accessory structure for providing performance based illumination signals in response to user input received in response to user interaction with a set of input elements carried by a computer input device that includes a housing, the accessory structure comprising:
- a cover that is coupleable to a portion of the computer input device, the computer input device communicable with a computing device;
- a set of illumination devices carried by the cover; and
- an illumination control unit in signal communication with the set of illumination devices, the illumination control unit configured to maintain an input device signal count and configured to selectively activate the set of illumination devices based upon the input device signal count during a predetermined time interval;
- wherein the input device signal count is compared to a plurality of predetermined threshold values to determine a set of illumination parameters for selectively activating the set of illumination devices;
- wherein at least one of the plurality of predetermined threshold values and the set of illumination parameters is programmable with a graphical user interface (GUI) on the computing device: and
- wherein the set of illumination parameters is downloadable from the computing device into the computer input device.

37. The accessory structure of claim 36, wherein the cover comprises a face plate configured to fit one from the group of a game controller and a cellular telephone.

38. The accessory structure of claim 36, wherein the cover comprises a support member configured to fit a portion of one from the group of a game console housing and a computer housing.

39. The accessory structure of claim 36, further comprising one from the group of a battery and a power source link coupled to the set of illumination devices.

* * * * *